United States Patent [19]

MacDonald

[11] 3,868,243

[45] Feb. 25, 1975

[54] METHOD OF MAKING GRANULAR TRIPLE SUPERPHOSPHATE FERTILIZER

[75] Inventor: Robert A. MacDonald, Byram, Conn.

[73] Assignee: Ferguson Industries, Inc., Dallas, Tex.

[22] Filed: Jan. 14, 1974

[21] Appl. No.: 433,253

Related U.S. Application Data

[63] Continuation-in-part of Ser. No. 214,375, Dec. 30, 1971, abandoned.

[52] U.S. Cl. ................................................. 71/41
[51] Int. Cl. ........................................... C05b 1/00
[58] Field of Search ...................................... 71/41

[56] References Cited
UNITED STATES PATENTS

| | | | |
|---|---|---|---|
| 1,870,602 | 8/1932 | Case | 71/41 |
| 2,015,384 | 9/1935 | Nordengren | 71/41 |
| 2,106,223 | 1/1938 | Nordengren | 71/41 |
| 2,740,115 | 3/1956 | Facer | 71/41 |
| 2,913,330 | 11/1959 | Wilson | 71/41 |

*Primary Examiner*—Samih N. Zaharna
*Assistant Examiner*—Richard Barnes
*Attorney, Agent, or Firm*—Jack A. Kanz

[57] ABSTRACT

Disclosed is a method of making granular superphosphate by reacting comminuted phosphate rock with phosphoric acid. The process involves two reaction steps. A predetermined amount of phosphoric acid is reacted with phosphate rock in quantities to produce a flowable fluid excess acid slurry which will remain liquid and fluid at the temperature of the reaction. The slurry is then injected into an agitating mixer containing comminuted phosphate rock. The ratio of slurry to phosphate rock in the mixer is controlled to complete the reaction between the phosphate rock and phosphoric acid and produce a granulated superphosphate product having a moisture content of about 5% or less.

6 Claims, No Drawings

METHOD OF MAKING GRANULAR TRIPLE SUPERPHOSPHATE FERTILIZER

This application is a continuation-in-part of application Ser. No. 214,375 entitled "Method of Producing Granulated Fertilizers," filed Dec. 30, 1971 now abandoned.

This invention relates to superphosphate fertilizer. More particularly, it relates to methods of producing granulated triple superphosphate fertilizers by forming a fluid excess acid and phosphate medium and reacting the liquid medium with phosphate rock to form granules of triple superphosphate.

There is currently a strong demand for superphosphate fertilizers, preferably in the form of porous granules of superphosphate or triple superphosphate. Various widely used methods have been developed to produce superphosphate fertilizers. However, each process, while producing acceptable end product, suffers from certain inherent disadvantages.

Superphosphate and triple superphosphate are generally produced by reacting comminuted phosphate rock with phosphoric and/or sulfuric acid. This reaction is quite rapid and, unless carefully controlled, produces an end product which immediately sets up as a solid mass. Various processes have been developed for either converting the solid mass to a pelletized product or forming pelletized or granulated product during the initial reaction. According to one known process, comminuted phosphate rock and phosphoric acid are passed briefly through a mixer reactor and the reaction product immediately deposited to allow a bulk build-up thereof. The reaction product immediately solidifies and the reaction continues in the bulk deposit while the deposit is partially cured. This process is generally referred to as "denning."

The denned product is thereafter particulated by rasping and formed into granules by passing the comminuted denned product through a mixer where moisture is introduced in the form of steam and/or water to effect agglomeration.

It will be apparent that in the denning process expensive and bulky equipment is required for denning the product, rasping the denned product and handling the product during each step. Furthermore, rasping of the denned product produces harmful dust which is dangerous to workers and must be carefully controlled.

It will also be apparent that agglomeration of the particulated denned product requires the introduction of water which must then be removed by expensive and bulky drying equipment to produce an acceptable granulated fertilizer which will not cake and form an unacceptable solid mass.

In accordance with the process known as the mixer-granulation process, acid is injected into an agitated mixing bed comprising finely divided ground phosphate rock, recycled superphosphate, and usually including previously denned superphosphate.

In both of the above described processes the superphosphate must be taken from a curing pile or storage bin and rasped, screened, etc., to ensure a fine particle size; and further requires mixing solids under conditions to form agglomerate masses resembling putty balls. Moisture and acid content must be carefully controlled to provide agglomeration while avoiding sticking to the sides of the dryer and to other particles. Obviously these processes involve the great expense of denning, stockpiling and aging the superphosphate as well as large and expensive handling and drying equipment. Furthermore, in processes using medium strength acid, significant quantities of water are introduced into the granulation system which must be subsequently removed before a commercially acceptable product is achieved. Removal of water is not only expensive and time-consuming, but requires carefully controlled energy-consuming drying equipment.

In still another process, known as the Dorr-Oliver granulation process, ground phosphate rock is mixed with partially concentrated phosphoric acid to form a slurry which flows into a blunger. Granulation is accomplished by introduction of recycled fines which become coated with the slurry. The mixture leaves the blunger as a damp mass of four to five percent moisture content and passes through a rotary dryer wherein temperatures of about 90°C to about 100°C are maintained. Fines separated from the dry product require recycling as many as fifteen times to acquire sufficient successive layers of slurry to meet the granular size requirements.

In the Dorr-Oliver process, if the quantity of phosphate rock to be converted into slurry is of the order of 212 parts per weight, the phosphoric acid of 38% $P_2O_5$ required is of the order of 202 parts $P_2O_5$ and 252 parts water, totalling 743 parts by weight of slurry. The granulated discharge consisting of the above slurry plus recycled material containing 3% moisture must yield a mass with at least 5% moisture. To obtain the discharge mixture, the 743 parts of slurry must be mixed with 11,375 parts by weight of recycled fines. Thus the ratio of fresh solids having a 3% moisture content to recycled fines is 528:11,375, i.e., 1:21.5. Obviously massive recycling equipment is required which involves multiple material handling operations.

In accordance with the present invention, granular fertilizer is produced having desirable properties of low moisture content but which avoids the need for or use of large quantities of denned superphosphate, multiple solids handling equipment and massive drying equipment. In accordance with the invention a stable fluid slurry is produced by reacting comminuted phosphate rock and phosphoric acid at a temperature in the range of between about 175°F and 260°F. The liquid slurry is formed by reacting from about 15% to about 60% of the total rock quantity which would be required for production of the ultimate superphosphate to form a stable fluid medium. At no time is sufficient phosphate rock added to the slurry to form a reaction product which does not remain a stable flowable fluid at the temperature of the reaction. The slurry is then fed into a mixer simultaneously with the amount of phosphate rock required for production of the ultimate superphosphate. The mixed product immediately forms a granular solid.

Since no water is added to the reaction product, very little, if any, further processing or drying is required to reduce the moisture content to the required 3 to 5% and the reaction product is sufficiently dry and after cooling can immediately be placed in bags for shipment. Since the product is essentially dry, essentially no caking occurs even though further curing does actually occur in the final product.

It will be appreciated that the process of the invention involves two separate reaction steps. In the first reaction step phosphate rock is added to phosphoric acid only in amounts which are not sufficient to form a solid product at the temperature maintained. In other words, phosphate rock is added to the acid in sufficient amounts to produce a fluid excess acid slurry which remains fluid so long as the temperature of the reaction is maintained. Accordingly, the product of the first reaction is a partially reacted acid slurry. It is to be understood that the excess acid slurry produced in accordance with the invention must have sufficient excess acid to remain flowable as long as it is maintained at the temperature of the reaction as distinguished from excess acid reaction product produced in accordance with U.S. Pat. No. 2,740,115 to Facer wherein an excess acid precursor is produced which is a viscous plastic that hardens to a solid mass without cooling. Since the product of the first reaction of the present invention is flowable, it may be handled by gravity flow or pumps. The fluid slurry is then reacted directly with particulate solids in a granulator to produce an essentially dry granulated end product, the second reaction completing the acidulation of the required amount of phosphate rock. At no time prior to granulation is sufficient acid and rock combined to permit formation of a solid reaction product. Therefore, all handling of solid phosphate, denning, rasping, etc. are totally eliminated.

In accordance with the preferred practice of the invention comminuted phosphate rock is introduced into a vat reactor containing phosphoric acid having a concentration in the range of about 45 to about 55% $P_2O_5$. The ratio of $P_2O_5$ rock to $P_2O_5$ acid is maintained below that which will form a solid at the temperature of the reaction. More particularly, the ratio of $P_2O_5$ rock to $P_2O_5$ acid is maintained in the range between about 0.052:1 and 0.21:1. When the phosphate rock is added to the acid reaction occurs immediately and the temperature of the slurry immediately rises to a temperature between about 175°F and about 260°F. In this temperature range the slurry remains fluid and is essentially stable. Thus the fluid slurry of partially reacted acid and rock may be easily transferred without the use of large and expensive materials handling equipment.

In accordance with the preferred practices of the invention, phosphate rock having a total phosphate of about 72% bonephosphate of lime (BPL) is comminuted to produce a granular phosphate rock of which at least 75% will pass through a 200 mesh screen. The phosphate rock is mixed with 52% phosphoric acid. Approximately 15 to 60% of the phosphate rock required to produce triple superphosphate is added to the acid to produce a fluid slurry. The slurry is maintained at a temperature between about 175°F and 260°F. It will be readily understood that the ratio of phosphate rock and phosphoric acid required to produce superphosphate will vary with the rock and acid concentration. The ratio must therefore be determined by conventional means as is ordinarily done and understood by those skilled in the art.

To complete the reaction and form the granular product of the invention, the above described slurry is injected into a tumbler or mixer containing particulate phosphate rock in the amount required to react with the excess acid in the slurry and produce the desired superphosphate. The particulate phosphate rock injected into the mixer preferably has a particle size of which at least 85% thereof will pass through a 200 mesh screen. The weight ratio of $P_2O_5$ of added rock to $P_2O_5$ of slurry injected into the tumbler is maintained in the range of between about 0.298:1.052 and 0.14:1.21. Since the slurry comprises a mixture of superphosphate, acid, water and residue and will convert directly to a solid if the temperature is reduced, and since the reaction of phosphoric acid and phosphate rock is extremely rapid and produces a solid mass, the mixture of particulate phosphate rock and slurry forms a granular product comprising porous particles or granules of superphosphate or triple superphosphate which do not contain sufficient moisture to adhere to each other or to the walls of the mixer. Accordingly, when the slurry is injected into the additional phosphate rock, granules of triple superphosphate are formed which have the desired moisture content of about 3 to about 5% without ever forming a solid mass.

To prevent solidification from occurring in the reactor, the quantity of rock added to the acid is limited so that no solidification can occur other than by loss of the water by evaporation or unusual reduction of temperature. It should be noted that in either case the slurry may again be made liquid by slight addition of water. The liquid phase slurry will usually be comprised of a metastable solution with a restricted quantity of solids containing iron and aluminum phosphates and other minor impurities and a limited quantity of calcium phosphate solids. These, of course, do not limit the mobility of the reaction slurry.

The slurry is then allowed to flow into a tumbler or agitated bin mixer where the remaining balance, i.e., 85 to 40% of the total rock required for the production of commercial triple superphosphate, is present in comminuted form of particle size of which 85% will pass through a 200 mesh screen. Particle size of the rock is an important variable because of the short retention time in the reactor granulator. The solids present in the reactor granulator may be a combination of phosphate rock dust and recylced fines and may include, in addition to phosphate rock, a fertilizer selected from the group consisting of potassium salts and nitrogen compounds.

Formation of fresh plastic superphosphate by reaction of the above described slurry with the balance of the required phosphate rock produces a bonding material without the addition of large amounts of water. The heat supplied by the reaction furnishes the temperatures needed for optimum granulation effected at a low moisture level of about 3 to 5%. Ordinarily, additional independent drying steps are not required.

It will be apparent that by intercontrol of the described variables, granules (a majority of which will be within the −6 to +20 mesh standard screen size) will be readily produced. In all production, however, some oversize and some undersize granules will be produced. The oversized material is readily comminuted and combined with the undersized particles to produce recycled fines. The fines may be recycled through the mixer to produce granules of the desired size.

The invention will become better understood from the following example which is given by way of illustration without any intention that the invention be limited thereto.

EXAMPLE

A slurry was formed by adding 404 parts by weight of wet process phosphric acid of 50% $P_2O_5$ (containing 102 parts by weight of water and maintained at a temperature of about 200°) and 100 parts by weight of ground phosphate rock having a typical analysis of as follows:

| | |
|---|---|
| $P_2O_5$ | 32.6% |
| F | 3.8% |
| $Fe_2O_3$ | 1.4% |
| $Al_2O_3$ | 1.8% |
| CaO | 47.3% |
| Water and solubles | 6.5% |

A dry mixture containing 117 parts by weight of ground phosphate rock, 85% of which will pass through a 200 mesh screen, was added to a rotary agitator along with 4,775 parts by weight of recycled fines of 3% moisture content. The slurry was then added to the mixture of phosphate rock and recycled fines and agitation contintued. A porous granular product was produced which had a moisture content of 3.2%. A majority of the granules were within the −6 mesh to +20 mesh standard screen size.

It has been discovered that when using the concentrations, temperatures and rock distribution as set forth in this example, the moisture content of the granules is about 3 to about 4% and additional drying is unnecessary. However, if lower concentration acid is used, or if insufficient amount of recycled fines are used, the moisture concentration in the final product may be higher. While the granules produced will still be in the form of porous granules, it may be desirable to dry and cool the granules immediately after formation to reduce the moisture content to below about 5%. This may be readily accomplished by very simplified drying equipment since only a small amount of moisture, as compared to conventional processes, need be removed. Accordingly, huge expensive drying equipment is totally eliminated.

It should be noted that in the process of the invention the product is produced in granular form without ever passing through a denning, aging or storing step. Accordingly, the need for large storing, denning, rasping and materials handling equipment is eliminated. Furthermore, the granules produced are sufficiently dry immediately after production to be bagged for shipment or stored in bulk. It should be noted that additional curing will occur after the granules are formed. However, insufficient moisture remains in the granules to allow solidification and caking. Accordingly, the product remains in granular form without the production of hard cakes and without the attendant production of dust and fines.

It should also be noted that the process is particularly adaptable to continuous processes. For example, the initial reactor may be a vat wherein the required proportions of acid and rock are continuously injected and mixed to form a fluid slurry. The fluid slurry may be continuously pumped from the vat and injected into a tumbler mixer and the required proportions of slurry, phosphate rock and recycled fines continuously added to the tumbler. The granulated product may be continuously withdrawn from the tumbler, dried (if required) and bagged. Thus large expensive handling equipment is totally eliminated and a granular, essentially dry, product is immediately produced.

It will be further observed that the entire process may readily be automated to materially reduce the manpower required in the manufacturing process.

It should be understood that although the invention has been described with particular reference to a specific embodiment thereof, the form of the invention described in detail should be taken as the preferred embodiment of same, and that various changes and modifications may be resorted to without departing from the spirit and scope of the invention as defined by the appended claims.

What is claimed:

1. The method of making granular triple superphosphate comprising the steps of
   a. placing a predetermined amount of phosphoric acid in a reactor,
   b. maintaining the temperature in said reactor between about 175°F and about 260°F,
   c. adding sufficient comminuted phosphate rock to said reactor to form a fluid slurry which will remain fluid at said temperature between about 175°F and about 260°F but which will solidify if the temperature thereof is lowered substantially below said temperature between about 175°F and about 260°F,
   d. placing a predetermined quantity of comminuted phosphate rock in an agitating mixer, at least about 85% of said comminuted phosphate rock being of a particle size small enough to pass through a 200 mesh screen, and
   e. adding a sufficient amount of said slurry to said mixer to convert said predetermined quantity of phosphate rock to triple superphosphate.

2. The method set forth in claim 1 including the step of adding granular triple superphosphate to said agitating mixer.

3. The method of forming granular triple superphosphate fertilizer comprising the steps of
   a. forming a flowable slurry by reacting phosphate rock and phosphoric acid in a reactor,
   maintaining the weight ratio of $P_2O_5$ rock to $P_2O_5$ acid in said reactor between about 0.052:1 and about 0.21:1,
   c. maintaining the temperature in said reactor between about 175°F and about 260°F,
   d. withdrawing slurry from said reactor and injecting said slurry into an agitating mixer,
   e. simultaneously adding particulate phosphate rock to said slurry in said agitating mixer in amounts sufficient to maintain the weight ratio of $P_2O_5$ of added phosphate rock to $P_2O_5$ of injected slurry between about 0.298:1.052 and about 0.14:1.21, and
   f. agitating said slurry and said particulate phosphate rock in said agitating mixer to form granules of triple superphosphate fertilizer.

4. The method set forth in claim 3 wherein said phosphoric acid has a $P_2O_5$ concentration of about 45 to about 55%.

5. The method set forth in claim 3 including the additional step of drying said granules to reduce the water content thereof to about 3 to about 5% by weight.

6. The method set forth in claim 5 including the additional steps of
   a. separating said granules according to granule size, and
   b. recycling a portion of said granules through said agitating mixer.

* * * * *